July 22, 1969 J. FAISANDIER 3,456,681
PRESSURE REDUCER FOR HIGH RATES
Filed March 3, 1967
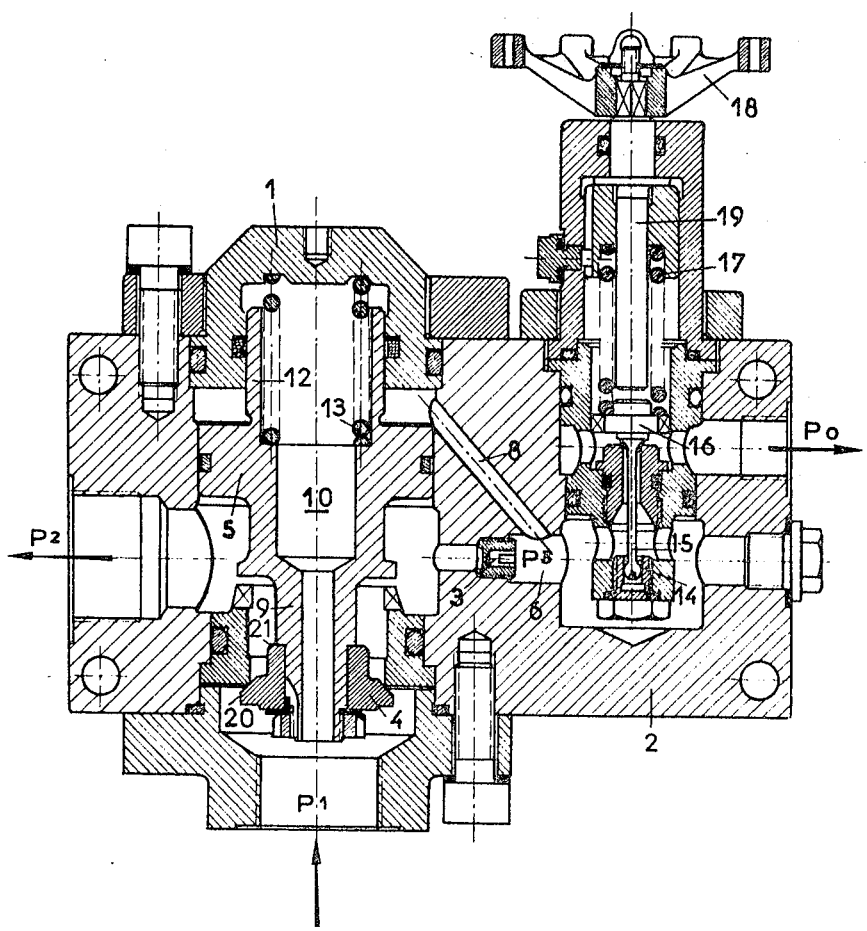

United States Patent Office 3,456,681
Patented July 22, 1969

3,456,681
PRESSURE REDUCER FOR HIGH RATES
Jacques Faisandier, 32 Blvd.-Felix-Faure, Chatillon-sous-Bagneux, Hauts-de-Seine, France
Filed Mar. 3, 1967, Ser. No. 620,514
Claims priority, application France, Feb. 16, 1967, 55,033
Int. Cl. F16k 31/12, 31/36
U.S. Cl. 137—489
2 Claims

ABSTRACT OF THE DISCLOSURE

A pressure reducer including a pressure reducing device of the balanced plunger type piloted by a relief valve by means of a calibrated orifice disposed between downstream pressure of the pressure reducing device and the downstream pressure of the relief valve.

Background of the invention

The present invention relates to pressure reducers, and in particular to pressure reducers for high rates of flow.

These devices are intended to lower the pressure of a circuit in order to adapt it to the requirements of one or more receivers arranged downstream, and for this purpose they operate as regulators for their downstream pressure; there are also devices known as relief valves which are in fact regulators for their upstream pressure.

Summary of the invention

The invention relates to a pressure-reducer for high rates of flow consisting of the combination of a pressure reducing device of the balanced plunger type, the plunger of which is controled by a piston, the first face thereof being acted on in closing direction by the downstream pressure, while the second face thereof is acted on in opening direction by the force of a spring and by a pressure controled by a sub-assembly consisting of a relief valve and a calibrated orifice arranged between the said downstream pressure and the pressure upstream of the relief valve whereby the regulation is maintained constant as a consequence of the action of the said sub-assembly on the said first face of said piston.

The conventional pressure reducers are excellently suited for flows of a few liters, but they lead to the use of springs of considerable strength and size for flows as high as 100 liters and more.

The object of the present invention is to alleviate this drawback by allowing to use a spring rated for a difference of pressure between a pressure intermediate the upstream and downstream pressures on one part and the downstream pressure on the other part instead of using a spring rated for a difference of pressure between the upstream pressure on one part and the downstream pressure on the other part.

An embodiment of the invention will be given below without the applicant, however, intending to limit the general scope of his invention to or by the specific details of the example which is given by way of illustration.

Brief description of the drawings

In the accompanying drawing:
The sole figure is a section along a plane passing through the axes of the two apparatus in series.

Description of the preferred embodiment

I designates generally the pressure reducing device while 2 is the relief valve, the two units being in communcation through a calibrated orifice 3.

$P_1$ designates the high pressure at the inlet, $P_2$ designates the reduced-pressure at the outlet towards the point of use, $P_0$ the pressure at the outlet of the relief valve 2 and $P_3$ the downstream pressure of the calibrated orifice.

The plunger 4 of the displaceable valve member is piloted by the piston 5, on whose lower face the reduced pressure $P_2$ acts in closing direction while its upper face is acted on in opening direction by the pressure $P_3$ which arrives there from the chamber 6, located downstream of the calibrated orifice 3 and upstream of the relief valve, through the conduit 8.

The piston 5 is balanced with respect to the upstream action of the high pressure $P_1$ on the displaceable member 9 due to the fact that a large bore 10, through the piston and the piston rod 9, permits the pressure $P_1$ to act on the rear part 12 of said displaceable member. The usual spring 13 urges the displaceable member downward in the figure, that is to say in the direction which causes the valve to open. This spring which opposes the pressure $P_2$–$P_3$ can therefore be selected weaker than if it opposed the pressure $P_2$–$P_0$.

The relief valve 2 has nothing special about it; it is of the well known plug type with hydraulic damping means. The function of relief valve 2 is to maintain the value of $P_3$ practically constant. Consequently, the position of balanced piston 5 is practically independent of $P_1$, as well as of $P_3$, during functioning of the device as a pressure reducer.

The dash pot 14 serves as guide for the rod 15 of the plunger 16 which rests via a conical surface on its seat.

The plunger 16 is subjected to the action of the calibrated spring 17, all of which is well known.

In accordance with the invention, the average value of $P_2$ may be adjusted only by means of the adjusting device with which the relief valve 2 is provided. This adjustment is effected by acting on the spring 17 by means of the handwheel 18 and the threaded rod 19.

This method of adjustment downstream of the calibrated opening 3 results in an extremely stable adjustment of the pressure $P_2$ and, indirectly, of the pressure $P_1$ in the upstream portion of the device. Furthermore the adjustment of $P_2$ is more precise and flexible than adjustment by means of the pressure reducing device 1 itself.

It has been found in most cases that it eliminates practically all the vibrations of the displaceable member of the regulator 1 due to transistory hydro-dynamic forces.

The flutter may be eliminated without recourse to mechanical frictions or a hydraulic dash pot, by imparting the plunger any shape of such nature that the equation of the movement admits a stable solution for all positions of the plunger.

The operation is as follows:

The movements of the piston 10 as a result of the variation in the pressure $P_2$, and hence in the difference $P_3$–$P_2$, cause transistory variations in pressure in the chamber 6 around an average value $P_3$, any increase in pressure in the chamber 6 tending to be cancelled out immediately by the action of the relief valve 2, while any decrease in pressure tends to be cancelled out by the increase in the flow through the calibrated orifice 3 and by the decrease in the flow through the relief valve 2.

The adjusting of $P_2$ is effected at will by operating the handwheel 18 which, by acting directly on the value of $P_3$ acts on the position of piston 5, hence indirectly on the value of $P_2$.

It can be seen that the device permits the value of $P_2$ and even of $P_1$ to drop below the adjustment value $P_3$, the small flow escaping through the orifice $P_3$ permitting the complete opening of the plunger 4.

What I claim is:
1. A pressure reducer comprising in combination
a pressure reducing device
a sub-assembly comprising
   a relief valve
   and a calibrated orifice
   and determining a pressure therebetween
said pressure reducing device including a balanced displaceable valve member comprising a plunger and a pilot control piston for said plunger, spring means being provided to press said displaceable means in opening direction—said piston having a first face submitted to the downstream pressure acting in closing direction and a second face submitted to the pressure determined by said sub-assembly to said second face of said piston
said calibrated orifice being disposed to be traversed by the flow of pressure fluid having the downstream pressure.
2. A pressure reducer as set for in claim 1 in which the relief valve is a variable relief valve.

References Cited

UNITED STATES PATENTS

| | | | |
|---|---|---|---|
| Re.25,524 | 2/1964 | Douglas | 137—489 |
| 2,047,101 | 7/1936 | Grove | 137—505.37 |
| 2,212,709 | 8/1940 | Grove | 137—505.42 |
| 1,091,536 | 3/1914 | Ross | 137—489 |
| 1,944,424 | 1/1934 | Gleeson | 137—489 |
| 2,308,753 | 1/1943 | Hart | 137—489 |
| 2,619,111 | 11/1952 | Renick | 137—489 |
| 2,747,606 | 5/1956 | Adams et al. | 137—489 |
| 3,174,410 | 3/1965 | Booth et al. | 137—491 XR |

M. CARY, NELSON, Primary Examiner

ROBERT J. MILLER, Assistant Examiner

U.S. Cl. X.R.

137—505.18

PO-1050
(5/69)

UNITED STATES PATENT OFFICE
CERTIFICATE OF CORRECTION

Patent No. 3,456,681            Dated July 22, 1969

Inventor(s) JACQUES FAISANDIER

It is certified that error appears in the above-identified patent and that said Letters Patent are hereby corrected as shown below:

In CLAIM 1, at line 14, after "sub-assembly" insert the following:

and acting in opening direction
conduit means being provided to transmit said pressure
    determined by said sub-assembly

SIGNED AND
SEALED
OCT 21 1969

(SEAL)
Attest:

Edward M. Fletcher, Jr.
Attesting Officer

WILLIAM E. SCHUYLER, JR.
Commissioner of Patents